United States Patent
Cochart et al.

(10) Patent No.: US 12,259,062 B2
(45) Date of Patent: Mar. 25, 2025

(54) SHOWER SYSTEM

(71) Applicant: Kohler Co., Kohler, WI (US)

(72) Inventors: Chad J. Cochart, Sheboygan, WI (US); Douglas J. Brouwer, Sheboygan, WI (US); Jack Robert Warning, Milwaukee, WI (US)

(73) Assignee: KOHLER CO., Kohler, WI (US)

( * ) Notice: Subject to any disclaimer, the term of this patent is extended or adjusted under 35 U.S.C. 154(b) by 0 days.

(21) Appl. No.: 18/473,732

(22) Filed: Sep. 25, 2023

(65) Prior Publication Data

US 2024/0019047 A1   Jan. 18, 2024

Related U.S. Application Data

(63) Continuation of application No. 17/721,783, filed on Apr. 15, 2022, now Pat. No. 11,767,930, which is a (Continued)

(51) Int. Cl.
*F16K 47/02* (2006.01)
*E03C 1/02* (2006.01)
(Continued)

(52) U.S. Cl.
CPC ............ *F16K 47/023* (2013.01); *E03C 1/02* (2013.01); *E03C 1/021* (2013.01); *E03C 1/025* (2013.01);
(Continued)

(58) Field of Classification Search
CPC ....... F16K 47/023; F16L 55/053; E03C 1/021
See application file for complete search history.

(56) References Cited

U.S. PATENT DOCUMENTS

| 5,038,823 A | 8/1991 | Kimura et al. |
| 11,306,846 B2 * | 4/2022 | Cochart ............... F16L 55/043 |

(Continued)

FOREIGN PATENT DOCUMENTS

| CN | 1492170 A | 4/2004 |
| CN | 1860319 A | 11/2006 |

(Continued)

OTHER PUBLICATIONS

Chinese First Office Action on CN Appl. Ser. No. 201910729954.9 dated Jan. 14, 2021 (9 pages).
(Continued)

*Primary Examiner* — Atif H Chaudry
(74) *Attorney, Agent, or Firm* — FOLEY & LARDNER LLP

(57) ABSTRACT

A shower system includes a shower waterway and a fluid control valve. The shower waterway is configured to be coupled to a shower device. The fluid control valve is coupled to the shower waterway and comprises a valve body and a piston. The valve body includes a chamber and a reservoir. The piston is slidably coupled to the valve body and fluidly separates the chamber from the reservoir. The chamber includes a compressible gas. The piston is configured to slidably translate within the valve body to compress the compressible gas in response to a water pressure fluctuation in the shower waterway.

20 Claims, 4 Drawing Sheets

Related U.S. Application Data continuation of application No. 16/534,087, filed on Aug. 7, 2019, now Pat. No. 11,306,846.

(60) Provisional application No. 62/716,740, filed on Aug. 9, 2018.

(51) Int. Cl.
  *E03C 1/122* (2006.01)
  *F16L 55/04* (2006.01)
  *E03C 1/12* (2006.01)

(52) U.S. Cl.
  CPC ............ *E03C 1/1222* (2013.01); *F16K 47/02* (2013.01); *F16L 55/043* (2013.01); *E03C 2001/1206* (2013.01); *E03C 2201/60* (2013.01); *Y10T 137/3118* (2015.04)

(56) References Cited

U.S. PATENT DOCUMENTS

| | | | |
|---|---|---|---|
| 11,767,930 B2* | 9/2023 | Cochart | F16K 47/023 137/606 |
| 2001/0044954 A1 | 11/2001 | DiCarlo | |
| 2004/0261864 A1 | 12/2004 | Coll | |
| 2008/0041779 A1 | 2/2008 | Farace | |
| 2011/0041561 A1 | 2/2011 | Apel | |
| 2016/0102780 A1 | 4/2016 | Kennedy | |

FOREIGN PATENT DOCUMENTS

| | | |
|---|---|---|
| CN | 101251203 A | 8/2008 |
| CN | 201273386 Y | 7/2009 |
| DE | 40 18 601 A1 | 12/1990 |
| DE | 41 27 629 A1 | 3/1993 |
| DE | 44 39 832 A1 | 5/1996 |
| EP | 3 258 018 A1 | 12/2017 |
| JP | H08-284219 | 10/1996 |
| KR | 200180746 Y1 * | 5/2000 |
| KR | 20110009267 U * | 9/2011 |

OTHER PUBLICATIONS

Chinese Office Action on CN Appl. Ser. No. 201910729954.9 dated Aug. 4, 2021 (9 pages).
Extended European Search Report for EP Appl. Ser. No. 19190543.9 dated Jan. 2, 2020 (8 pages).
Final Office Action on U.S. Appl. No. 17/721,783 Dtd Apr. 27, 2023.
Final Office Action on U.S. Appl. No. 16/534,087 dated Jan. 7, 2021 (9 pages).
Indian First Examination Report on IN Appl. Ser. No. 201914032213 dated Dec. 8, 2020 (6 pages).
Non-Final Office Action on U.S. Appl. No. 17/721,783 Dtd Nov. 10, 2022.
Non-Final Office Action on U.S. Appl. No. 16/534,087 dated Sep. 21, 2020 (8 pages).
Notice of Allowance on U.S. Appl. No. 17/721,783 Dtd May 25, 2023.
U.S. Notice of Allowance on U.S. Appl. No. 16/534,087 Dtd Dec. 14, 2021.
U.S. Office Action on U.S. Appl. No. 16/534,087 dated Jun. 3, 2021 (9 pages).

* cited by examiner

SHOWER SYSTEM

CROSS-REFERENCE TO RELATED PATENT APPLICATIONS

This application is a continuation of U.S. patent application Ser. No. 17/721,783, filed Apr. 15, 2022, which is a continuation of U.S. patent application Ser. No. 16/534,087, filed Aug. 7, 2019, which claims the benefit of and priority to U.S. Provisional Application No. 62/716,740, filed Aug. 9, 2018, the entire disclosures of which are hereby incorporated by reference herein.

BACKGROUND

The present disclosure relates generally to the field of shower plumbing systems. More specifically, the present disclosure relates to an integral valve damper assembly for noise reduction in a shower plumbing system.

Water pressure fluctuations generated by opening or closing a valve in a residential shower system can be transmitted through water in the system to various components of the system. The pipes and associated plumbing fixtures can amplify these pressure fluctuations, creating bothersome background noise. In some high flow rate systems, such as washing machines and dishwashers, pressure fluctuations can be severe enough to damage the pipes or cause them to collapse (commonly referred to as "water hammer").

In addition, the fluctuations may cause damage if the pipes are allowed to vibrate against other materials in the wall, such as steel studs. There are various add-on solutions for addressing the severe water hammer issues in high flow rate systems. These add-on solutions, however, tend to be too large and over-engineered for use in low flow rate systems, such as residential shower systems. In addition, the utilization of such solutions may be limited by the need to position them near an access panel or open location in order to gain access to them for servicing.

SUMMARY

At least one embodiment of the present disclosure relates to a shower system. The shower system includes a shower waterway and a fluid control valve. The shower waterway is configured to be coupled to a shower device. The fluid control valve is coupled to the shower waterway and comprises a valve body and a piston. The valve body includes a chamber and a reservoir. The piston is slidably coupled to the valve body and fluidly separates the chamber from the reservoir. The chamber includes a compressible gas. The piston is configured to slidably translate within the valve body to compress the compressible gas in response to a water pressure fluctuation in the shower waterway.

Another embodiment relates to a shower system. The shower system includes a fluid control valve configured to be coupled to a shower waterway. The fluid control valve includes a valve body and a piston. The valve body includes a chamber and a reservoir. The piston is slidably coupled to the valve body and fluidly separates the chamber from the reservoir. The chamber includes a compressible gas. The piston is configured to slidably translate within the valve body to compress the compressible gas in response to a water pressure fluctuation in the shower system.

Another embodiment relates to a fluid control valve for a shower system. The fluid control valve includes a valve body and a piston. The valve body includes a chamber and a reservoir. The piston is slidably coupled to the valve body and fluidly separates the chamber from the reservoir. The chamber includes a compressible gas. The piston is configured to slidably translate within the valve body to compress the compressible gas in response to a water pressure fluctuation in the shower system.

Another embodiment relates to a valve damper assembly that is part of a valve body for a fluid control valve of a shower system. The valve body includes an internal cavity, which is separated into a reservoir on a lower end and a chamber containing a compressible gas on an upper end by a damper, such as a slidable piston. The valve damper assembly is configured such that when the valve is opened/closed and a pressure fluctuation is generated, at least a portion of the water flow may be diverted into the reservoir, causing the damper to effectively absorb the pressure fluctuation caused by the valve actuation. In this way, the volume of the chamber may be decreased due to the pressure acting on the piston exceeding the opposite pressure exerted on the piston from the compressible gas contained within the chamber. The valve body may also include an adjustable vent for adjusting the amount of compressible gas in the chamber, so as to adjust the relative position of the piston.

DETAILED DESCRIPTION

Prior to turning to the figures, which illustrate the one or more exemplary embodiments in detail, it should be understood that the present disclosure is not limited to the details or methodology set forth in the description or illustrated in the figures. It should also be understood that the terminology used herein is for the purpose of description only and should not be regarded as limiting.

Generally speaking, "water hammer arrestors" are commonly used in high flow rate plumbing systems, such as washing machines and dishwashers (e.g., flow rates greater than 10 gpm, etc.), to help reduce water hammer (i.e., the noise and vibration that may result from a water valve closing suddenly, causing pressure fluctuations to be transmitted through the plumbing system). In such plumbing systems, when a valve is opened/closed, the instantaneous velocity of water within the system may cause a pressure spike that can create shock waves that transmit through the system, causing a thumping noise or a pipe to vibrate. In an effort to absorb this shock wave, a water hammer arrestor may be installed upstream of the valve (i.e., before the valve in the system), such that as the valve closes suddenly, the pressure spike may be diverted to the arrestor to absorb the pressure fluctuation, rather than transmitting through the plumbing system. However, water hammer arrestors are often large in size to sufficiently absorb the pressure fluctuations that are typically associated with these high flow rate systems. Furthermore, the bulky size of these devices may result in very limited applications for where the water hammer arrestor may be installed within the system. In addition, these water hammer arrestors are typically engineered to handle significant forces that may result from the pressure spikes normally associated with only high flow rate systems. Thus, there is a need for a smaller scale device that can reduce or eliminate the noise associated with pressure fluctuations experienced in low flow rate systems, such as a residential shower system.

Referring generally to the FIGURES, disclosed herein is an integral valve damper assembly for use in a residential shower system. The disclosed valve damper assembly is designed to be integrated into a valve body of a fluid control valve that controls water flow through the shower system, so as to provide for a more compact design and to allow for easy access/maintenance, as compared to conventional water hammer arrestors. The valve damper assembly has a structural configuration that is advantageously designed to address pressure fluctuations that are typically experienced in low flow rate systems, such as a shower system, which operate at flow rates of about 2-5 gpm. In addition, the valve damper assembly can, advantageously, be selectively adjusted to tailor the assembly to a particular application, depending on the degree of pressure fluctuations experienced by a particular system.

Figure 1:
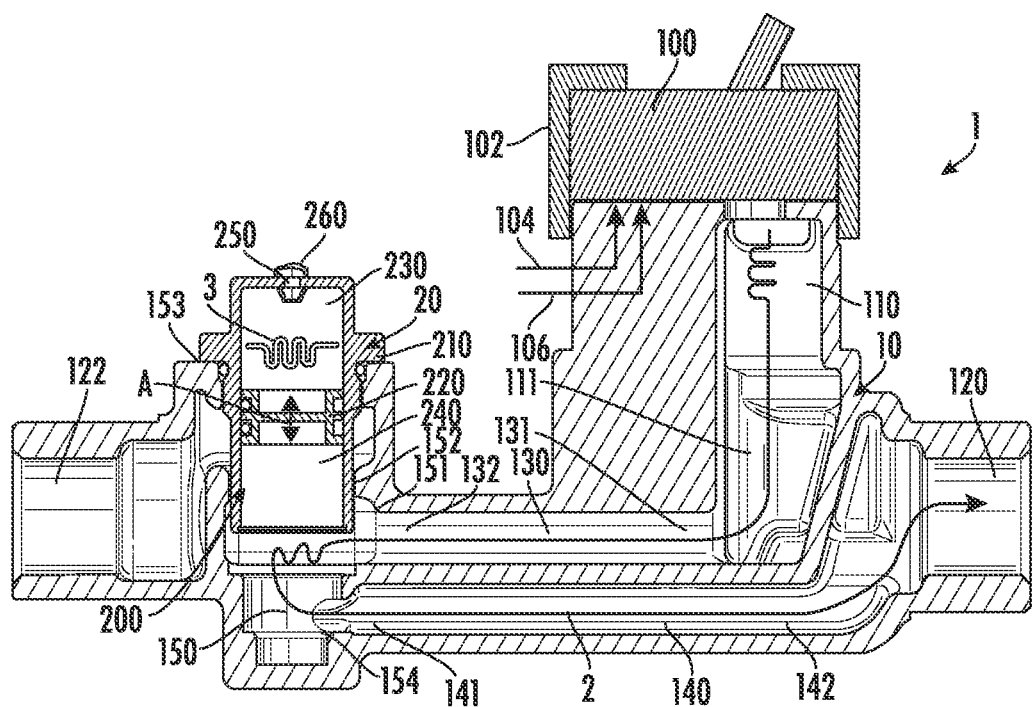
FIG. 1 is a schematic illustration of a valve damper assembly according to an exemplary embodiment.

Referring to FIG. 1, a schematic illustration of a plumbing system 1 (e.g., shower system, etc.) is shown, according to an exemplary embodiment. The plumbing system 1 is shown to include a single control valve cartridge 100 (e.g., fluid control valve, shower mixing valve, etc.), a shower waterway 10, and a valve body 20. The single control valve cartridge 100 is shown to be coupled to the plumbing system 1 by way of retaining nuts 102, and is configured to selectively fluidly couple a cold water feed 104 and a hot water feed 106 to the plumbing system 1 from a cold water source and a hot water source, respectively. The single control valve cartridge 100 may be configured to receive an input to selectively change between an open position, a closed position, or any position therebetween (i.e., partially open or restricted). In an open position, the single control valve cartridge 100 allows at least a portion of each of the cold water feed 104 and hot water feed 106 to flow through the single control valve cartridge 100, and enter the remaining portions of the plumbing system 1. In a closed position, the single control valve cartridge 100 prevents the cold water feed 104 and hot water feed 106 from entering the remaining portions of the plumbing system 1. However, once the single control valve cartridge 100 is returned to an open position from a closed position, at least a portion of each of the cold water feed 104 and hot water feed 106 will again be able to flow through the single control valve cartridge 100, and enter the remaining portions of the plumbing system 1.

The shower waterway 10 is shown to include a water inlet 110, a first water outlet 120, a second water outlet 122, a first lateral waterway 130, and a second lateral waterway 140 fluidly coupled therebetween. The shower waterway 10 may be generally cylindrical pipes which may extend from a water source to, for example, a shower device, such as a showerhead or handheld sprayer. The shower waterway 10 is configured to fluidly receive and contain a water flow 2 that flows from the cold water feed 104 and/or hot water feed 106, through the single control valve cartridge 100, to the water inlet 110, then to at least one of the first water outlet 120 or second water outlet 122. According to an exemplary embodiment, the water flow 2 is has a flow rate in the range of about 2 gpm to about 5 gpm, as is typical for a residential shower system. The single control valve cartridge 100 is shown to couple to the water inlet 110, such that the water flow 2 flows from the single control valve cartridge 100 to the water inlet 110. A first end 131 of the first lateral waterway 130 fluidly couples a lower end 111 of the water inlet 110. A second end 132 of the first lateral waterway 130 is in fluid communication with and couples a connector 150 at a first side 151 of the connector 150. The connector 150 fluidly couples a first end 141 of the second lateral waterway 140 at a lower end 154 of the first side 151 of the connector 150, and fluidly couples an opening 152 at a top side 153 of the connector 150. A second end 142 of the second lateral waterway 140 fluidly couples to the water outlet 120. In this way, the water flow 2 may flow from the water inlet 110, through the first lateral waterway 130, connector 150, and second lateral waterway 140, before exiting the shower waterway 10 through the water outlet 120.

The plumbing system 1 is shown to include a valve body 20 that is at least partially received within the opening 152 at the top side 153 of the connector 150. It should be noted that only the valve body 20 is depicted in the FIGURES for ease of reference, but it should be appreciated that the valve body 20 forms part of a conventional fluid control valve for a shower that includes additional internal components that a conventional fluid control valve for a shower would include (e.g., seals, internal valving, etc.). The fluid control valve including the valve body 20 may control a flow of water through the system (e.g., flow rate, etc.). As shown in FIG. 1, the valve body 20 may have a generally cylindrical shape and is shown to be oriented in a vertical orientation. However, it should be appreciated that the valve body 20 may have other shapes besides cylindrical, and may be positioned in any other suitable orientation. The outer perimeter of the valve body 20 may couple to and abut an inner perimeter of the opening 152 of the connector 150. The valve body 20 further includes a flange 210 which extends radially outward from the outer perimeter of the valve body 20. A lower surface of the flange 210 couples to and abuts the top side 153 of the opening 152 of the connector 150, such that the flange 210 is configured to help position the valve body 20 within the connector 150.

Still referring to FIG. 1, the valve body 20 has an internal cavity 200 which has a generally cylindrical shape. The internal cavity 200 of the valve body 20 is shown to include a chamber 230 at an upper end and a reservoir 240 at a lower end, which are separated by a piston 220. The piston 220 may include one or more seals (e.g., O-ring seals, etc.) for fluidly separating the chamber 230 from the reservoir 240, but also allowing for slidable movement of the piston 220 within the internal cavity 200. The chamber 230 may be filled with a compressible gas 3 (e.g., air, etc.). The reservoir 240 is in fluid communication with the shower waterway 10, such that water may flow from the shower waterway 10 to the reservoir 240 to engage the piston 220. The piston 220 is configured to slidably translate within the internal cavity 200 along a direction indicated generally by arrow "A" in response to a water pressure fluctuation in the shower waterway 10, the details of which are discussed in the paragraphs that follow.

The valve body 20 further includes a vent 250 and a vent screw 260 disposed at a top side of the valve body 20. The vent 250 is configured to selectively fluidly couple the chamber 230 to the external environment. In other words, the vent 250 may allow the compressible gas 3 within the chamber 230 of the valve body 20 to selectively exit the chamber 230 to adjust the pressure within the chamber 230. The vent screw 260 is coupled to the vent 250 and is configured to allow a user to selectively adjust (e.g., loosen or tighten, etc.) the vent screw 260 as a means of controlling the amount of compressible gas 3 within the chamber 230. In effect, the amount of compressible gas 3 within the chamber 230 directly relates to the positioning of the piston 220 within the valve body 20. For example, if a user adjusts the vent screw 260 to allow the vent 250 to open, compressible gas 3 may be permitted to exit the chamber 230, resulting in less compressible gas 3 within the chamber 230. When a force is applied to the lower side of the piston 220 (e.g., due to a water pressure fluctuation within the system), the piston 220 may translate upward within the internal cavity 200, causing the volume of the reservoir 240 to increase and the volume of the chamber 230 to decrease. The amount of compressible gas 3 within the chamber 230 at least partially dictates how far upward the piston 220 is able to translate (i.e., how much the volume of the chamber 230 may be reduced and how much the volume of the reservoir 240 may increase). In this way, if a user selectively adjusts the vent screw 260, the user may adjust the positioning and responsiveness of the piston 220, depending on a particular application.

In operation, the plumbing system 1 may experience a sudden disruption of flow (e.g., a fast open or close at the water outlet 120), which may create a water pressure fluctuation (generally illustrated as a sinusoidal line segment along the flow path 2). The pressure fluctuations will be carried through the valve and associated plumbing, and may generate noise and potential system damage. A valve damper (e.g., the valve body 20 having an internal cavity 200 with a piston 220, a chamber 230 having compressible gas 3, and a reservoir 240) as part of the fluid control valve for the system is located near the source of the pressure disruption at the valve, and may effectively dampen the pressure fluctuations at that location. In other words, the piston 220 may act as a shock absorber, and as the water flow 2 is disrupted (e.g., due to operation of the fluid control valve defined by valve body 20), the water flow 2 may be diverted up into the reservoir 240 such that the piston 220 may absorb the pressure fluctuations of the water flow 2 by translating upwards to compress the compressible gas 3 within the chamber 230. This shock absorption by the piston 220 may result in a reduction or elimination of the noise and/or vibrations caused by the flow disruption. In addition, the vent screw 260 allows for potential reset or adjustment of the piston 220.

Figure 2:
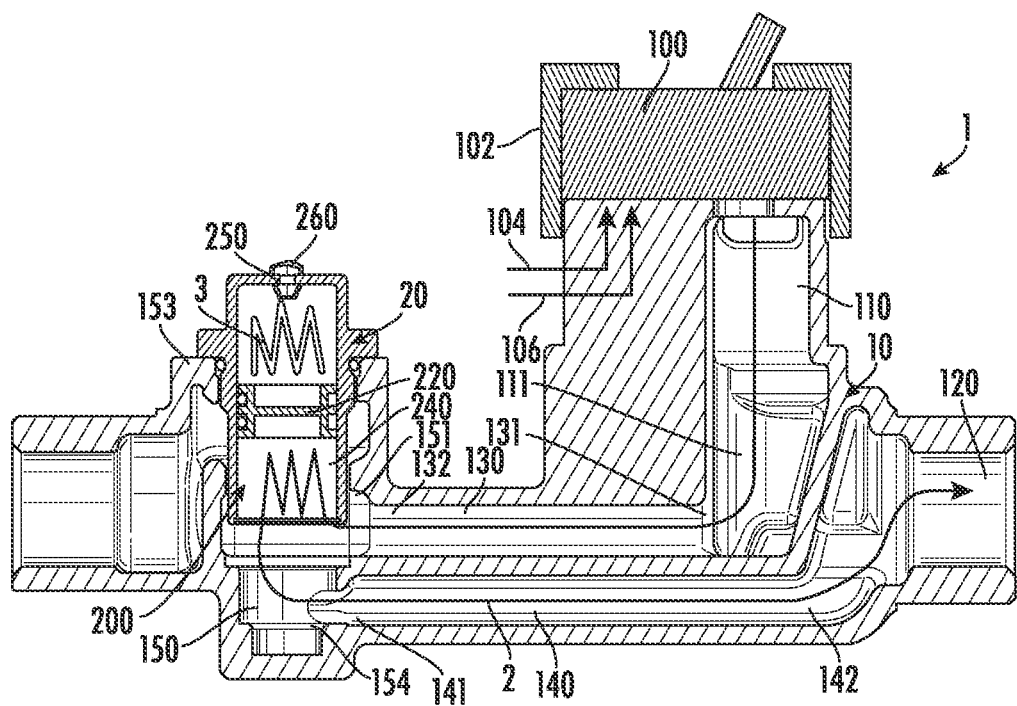
FIG. 2 is a schematic illustration of the valve damper assembly of FIG. 1 at a first time, when the piston is at a first position.

Referring now to FIG. 2, a schematic illustration of the plumbing system 1 at a first time, when the piston 220 is in a first position is shown. When the single control valve cartridge 100 is closed, the water flow 2 will be prevented from flowing through the single control valve cartridge 100 to the remainder of the plumbing system 1. Instead, the water flow 2 that is already in the plumbing system 1 will flow from the water inlet 110, through the first lateral waterway 130 towards the connector 150. The water will flow through the connector 150, through the second lateral waterway 140, and finally exit the plumbing system 1 through the water outlet 120. During this time, the piston 220 may remain in a first, resting position, where the downward force exerted on the piston from the compressible gas 3 within the chamber 230 is equal to the upward force exerted on the piston 220. In other words, both the chamber 230 and the reservoir 240 may be at atmospheric pressure, such that atmospheric pressure is exerted on both sides of the piston 220, resulting in the piston 220 remaining in a first, resting position.

Figure 3:
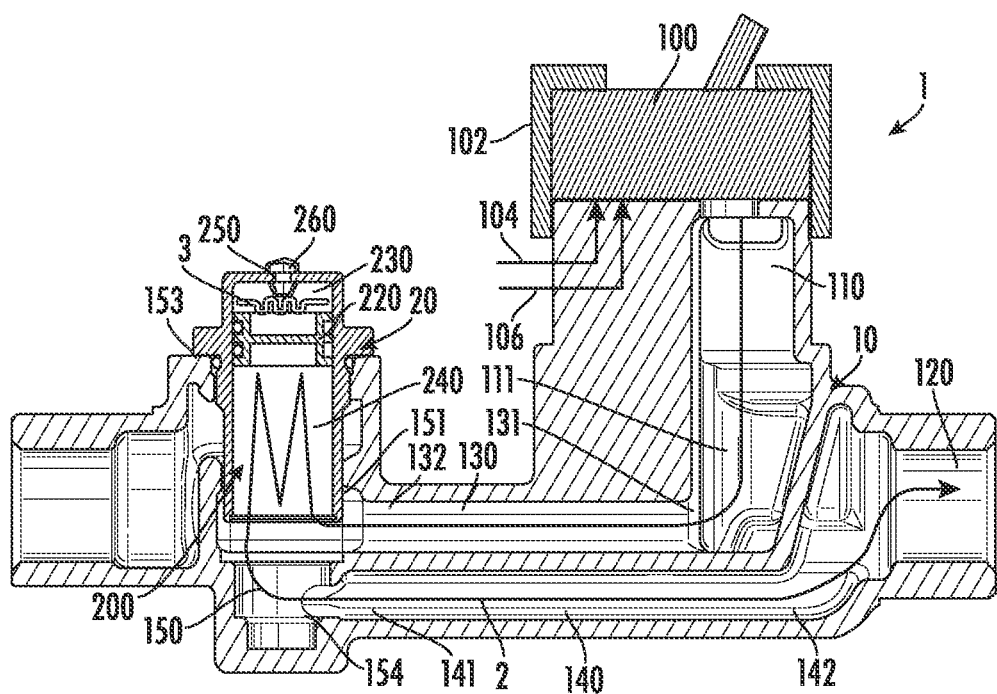
FIG. 3 is a schematic illustration of the valve damper assembly of FIG. 1 at a second time, when the piston is at a second position.

Referring now to FIG. 3, the single control valve cartridge 100 may be in an open position, such that water flows from the cold water feed 104 and the hot water feed 106, mixes within the single control valve cartridge 100, and enters the remainder of the plumbing system 1. As at least a portion of the water flow 2 is diverted into the reservoir 240 of the valve body 20, the pressure spike from the water flow 2 against the piston 220 may cause the piston 220 to compress the compressible gas 3 within the chamber 230 of the valve body 20. In other words, the downward force exerted on the piston 220 by the compressible gas 3 may be less than the upward force on the piston 220 by the water flow 2, causing the piston 220 to translate upward, thus reducing the volume of the chamber 230 and increasing the volume of the reservoir 240 as the reservoir 240 accumulates at least a portion of the water flow 2. As the piston 220 is translated upward, the piston may be in a second, compressed position.

Figure 4:
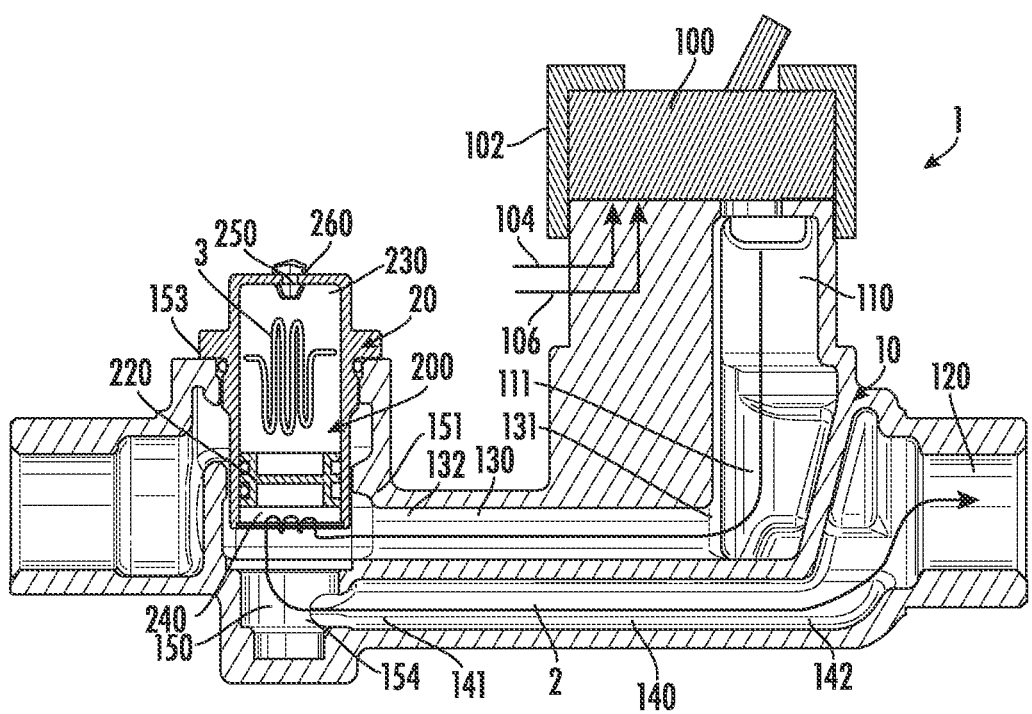
FIG. 4 is a schematic illustration of the valve damper assembly of FIG. 1 at a third time, when the piston is at a third position.

Referring now to FIG. 4, immediately after the single control valve cartridge 100 is switched to a closed position (i.e., such that water is not flowing through the single control valve cartridge 100 and into the remainder of the plumbing system 1, the resulting pressure fluctuation of the water flow 2 will likely cause the piston 220 to overshoot the first, resting position (i.e., such that the piston 220 will move to a third position, where the volume of the reservoir 240 is momentarily smaller than the volume of the reservoir 240 in a first position, while the volume of the chamber 230 is momentarily greater than the volume of the chamber 230 in a first position). Once the pressure fluctuation is effectively absorbed (i.e., the water flow 2 was at least partially diverted into the reservoir 240, forcing the piston 220 to translate upwards to a second, compressed position and downwards to the third position), the piston 220 may again return to a first position. In other words, immediately after the single control valve cartridge 100 is closed, the water flow 2 may enter the reservoir 240 and force the piston 220 upward, but once the compressible gas 3 within the chamber 230 reacts to force the piston 220 downward to the third position, the water flow 2 is able to displace, and the upward force on the piston 220 from the water flow 2 may cause the piston to translate back towards a first, resting position, thus again decreasing the volume within the reservoir 240 and increasing the volume within the chamber 230. In addition, the vent screw 260 is configured to be tightened or loosened by a user, to allow a user to selectively adjust the position of the piston 220 within the valve body 20. For example, the user may adjust the vent screw 260 (which in turn adjusts the opening of the vent 250 between the chamber 230 and outside environment) to reset the resting position of the piston to a third position. As shown in FIG. 4, when the vent screw 260 is adjusted to have the piston 220 translate to a position lower than an initial position (i.e., translating to a position where the volume of the reservoir 240 is less than the volume of the reservoir 240 before the vent screw 260 was adjusted), the downward force exerted on the piston 220 by the compressible gas 3 may exceed the upward force on the piston 220 by the water flow 2 within the reservoir 240, causing the piston 220 to have a new resting position, where the volume within the chamber 230 has increased and the volume within the reservoir 240 has decreased.

The valve damper assembly of the present disclosure is intended to reduce noise in low flow systems, such as shower plumbing systems. The valve damper assembly of the present disclosure may beneficially be more compact than other potential solutions, and can be integrated directly into the shower valve body. The integration of the valve damper assembly into the valve body beneficially may allow for easy access to and maintenance of the valve damper assembly.

According to other exemplary embodiments, a bladder or diaphragm may be utilized instead of a piston 220 as a damper. However, it should be appreciated that the valve damper assembly may operate in substantially the same manner. For example, the piston 220 may be substituted with an elastic diaphragm. The diaphragm may be configured to elastically deform to absorb a pressure fluctuation within the system. Alternatively, in some embodiments, a bladder may be used instead of a piston 220 or a diaphragm. The bladder may be located in the valve body 20 where the chamber 230 having compressible gas 3 and the piston 220 are located. The bladder may be an elastically deformable member which may contain a liquid, gas, or other compressible means. The bladder may be configured to deform or compress to absorb a pressure fluctuation within the system.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, and/or illustrations of possible embodiments (and such terms are not intended to connote that such embodiments are necessarily extraordinary or superlative examples).

The term "coupled," as used herein, means the joining of two members directly or indirectly to one another. Such joining may be stationary (e.g., permanent or fixed) or moveable (e.g., removable or releasable). Such joining may be achieved with the two members coupled to each other, with the two members coupled with a separate intervening member and any additional intermediate members coupled with one another, or with the two members coupled together with an intervening member that is integrally formed as a single unitary body with one of the two members. Such members may be coupled mechanically, electrically, and/or fluidly.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the valve damper assembly as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, the position of elements may be reversed or otherwise varied, and the nature or number of discrete elements or positions may be altered or varied. Any element disclosed in one embodiment may be incorporated or utilized with any other embodiment disclosed herein. Although one example of an element that can be incorporated or utilized in another embodiment has been described above, it should be appreciated that other elements of the various embodiments may be incorporated or utilized with any of the other embodiments disclosed herein.

Other substitutions, modifications, changes and omissions may also be made in the design, operating conditions and arrangement of the various exemplary embodiments without departing from the scope of the present invention. For example, any element disclosed in one embodiment may be incorporated or utilized with any other embodiment disclosed herein. Also, for example, the order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration, and arrangement of the preferred and other exemplary embodiments without departing from the scope of the appended claims.

What is claimed is:

1. A valve damper assembly comprising:
    a valve body defining:
        an interior cavity including a chamber and a reservoir, the chamber including a compressible gas;
        a flange extending radially away from the interior cavity and disposed at an intermediate position between opposing ends of the valve body, the flange configured to engage an external surface of a fluid control valve to position the valve body within a waterway of the fluid control valve; and
    a piston disposed within the interior cavity and movable with respect to the valve body, the piston including at least one seal that fluidly separates the chamber from the reservoir, the piston configured to compress the compressible gas in response to a water pressure change in the reservoir.

2. The valve damper assembly of claim 1, further comprising a vent configured to control an amount of compressible gas in the chamber.

3. The valve damper assembly of claim 2, wherein the vent includes a vent screw configured to be selectively adjusted to control the amount of compressible gas in the chamber.

4. The valve damper assembly of claim 1, wherein the piston is configured to slidably translate within the valve body based on a water flow rate in a range of about 2 gpm to about 5 gpm.

5. The valve damper assembly of claim 1, wherein the piston is disposed entirely within the interior cavity when the reservoir is at atmospheric pressure.

6. A valve damper assembly comprising:
a valve body defining:
an interior cavity including a chamber and a reservoir, the chamber including a compressible gas;
a flange extending radially away from the interior cavity, the flange configured to engage an external surface of a fluid control valve to position the valve body within a waterway of the fluid control valve; and
a piston disposed within the interior cavity and movable with respect to the valve body, the piston including at least one seal that fluidly separates the chamber from the reservoir, the piston configured to compress the compressible gas in response to a water pressure change in the reservoir; and
at least one valve body seal engaged with the valve body and configured to sealingly engage the valve body with the fluid control valve, the flange extending radially outwardly from an outer perimeter of the at least one valve body seal.

7. A fluid control valve assembly comprising:
a fluid control valve including:
a water inlet;
a water outlet;
a waterway extending between the water inlet and the water outlet; and
a control valve configured to selectively fluidly couple the water inlet to the water outlet; and
a valve damper assembly including:
a valve body coupled to the fluid control valve and extending into the fluid control valve, the valve body defining a chamber and a reservoir, the valve body including a flange engaging an external surface of the fluid control valve, the flange disposed at an intermediate position between opposing ends of the valve body; and
a piston disposed within the valve body, the piston fluidly separating the chamber from the reservoir, the chamber including a compressible gas, the piston configured to slidably translate within the valve body to compress the compressible gas in response to a water pressure change in the waterway.

8. The fluid control valve assembly of claim 7, wherein the valve damper assembly includes a vent configured to control an amount of compressible gas in the chamber.

9. The fluid control valve assembly of claim 8, wherein the vent includes a vent screw configured to be selectively adjusted to control the amount of compressible gas in the chamber.

10. The fluid control valve assembly of claim 7, wherein the piston is configured to slidably translate within the valve body based on a water flow rate in a range of about 2 gpm to about 5 gpm.

11. The fluid control valve assembly of claim 7, wherein the reservoir fluidly coupled to the waterway so that water may flow from the waterway into the reservoir to engage the piston.

12. The fluid control valve assembly of claim 7, further comprising at least one valve body seal engaged with the valve body and configured to sealingly engage the valve body with the fluid control valve, the flange extending radially outwardly from an outer perimeter of the at least one valve body seal.

13. The fluid control valve assembly of claim 7, wherein the water inlet is a cold water inlet, the fluid control valve further including a hot water inlet, the fluid control valve being a mixing valve operable to selectively control amounts of water passing through each of the cold water inlet and the hot water inlet.

14. The fluid control valve assembly of claim 7, wherein the fluid control valve further includes a connector, the valve damper assembly detachably coupled to the fluid control valve at the connector.

15. The fluid control valve assembly of claim 7, further comprising at least one valve body seal engaged with the valve body and configured to sealingly engage the valve body with the fluid control valve.

16. The fluid control valve assembly of claim 7, wherein the piston is disposed entirely within the valve body when the reservoir is at atmospheric pressure.

17. A method, comprising:
receiving water from a waterway of a fluid control valve into a reservoir of a valve body of a valve damper assembly that is (i) coupled to the fluid control valve, (ii) extends into the waterway, and (iii) includes a flange engaging an external surface of the fluid control valve, the flange disposed at an intermediate position between opposing ends of the valve body; and
repositioning a piston of the valve damper assembly that is disposed within the valve body from a first position to a second position in response to a water pressure change in the reservoir to compress a compressible gas in the valve body and to increase a size of the reservoir.

18. The method of claim 17, further comprising repositioning the piston from the second position to a third position that is entirely within the valve body in response to decreasing water pressure in the reservoir.

19. The method of claim 17, wherein in the first position the reservoir is at atmospheric pressure and the piston is disposed entirely within the valve body.

20. A valve damper assembly comprising:
a valve body defining:
an interior cavity including a chamber and a reservoir, the chamber including a compressible gas;
a flange extending radially away from the interior cavity, the flange configured to engage an external surface of a fluid control valve to position the valve body within a waterway of the fluid control valve; and
a piston disposed within the interior cavity and movable with respect to the valve body, the piston including at least one seal that fluidly separates the chamber from the reservoir, the piston configured to compress the compressible gas in response to a water pressure change in the reservoir, the flange spaced axially away from opposing axial ends of the interior cavity, the flange configured to determine a position of the valve body within the fluid control valve by preventing axial movement of the valve body further into the fluid control valve.

* * * * *